Feb. 17, 1970 E. WALDELIUS 3,496,292

IMPEDANCE CORRECTING COIL-LOADED CIRCUITS

Filed Aug. 22, 1966 2 Sheets-Sheet 1

INVENTOR.
Eric Waldelius

BY Hane and Nydick
Attorneys

INVENTOR
ERIC WALDELIUS
BY Hane and Nydick
ATTORNEYS

United States Patent Office 3,496,292

Patented Feb. 17, 1970

3,496,292

IMPEDANCE CORRECTING COIL-LOADED CIRCUITS

Eric Waldelius, Cederstromsvagen 21, Bromma, Sweden

Filed Aug. 22, 1966, Ser. No. 574,117

Claims priority, application Sweden, Aug. 31, 1965, 11,324/65

Int. Cl. H01b *11/14, 11/16;* H04m *1/00*

U.S. Cl. 178—45 2 Claims

ABSTRACT OF THE DISCLOSURE

An impedance compensator connects a coil loaded line including a plurality of loading sections terminated by an inductive half-section to the terminals of a telephone exchange. The impedance compensator comprises a series inductance that is substantially 0.3 times the inductance of a whole loading coil and a shunt capacitance that is 0.5 times the capacitance of a whole loading section. The shunt capacitance is on the exchange side of the compensator.

The present invention refers to a method for impedance correcting coil-loaded circuits.

For the impedance correcting of coil-loaded circuits starting with a capacitive half section or other fraction (up to about 0.8) of a whole loading-coil section, it is known how to use in a telephone system a half section of a low pass filter having a series element which is an inductance coil or a parallel resonance circuit to connect the line to the exchange.

The present invention refers to a method for impedance correcting coil loaded circuits where the circuit starts with an inductive half-section. It will be shown, however that this method is applicable also to coil-loaded circuits starting with a capacitive section, that is a half loading-section of cable or less and that many practical advantages may then be attained. The method according to the invention is mainly characterized in that there is inserted between the coil-loaded circuit, that is presumed to start with a half coil and a whole loading-section (FIG. 2), and the exchange an impedance compensator. The impedance compensator comprises a series inductance (FIG. 5) having an inductance which is 0.3 times the inductance of a whole loading-coil, and a shunt capacitance, that is about 0.5 times the capacitance of a whole loading-section.

Figure 1:
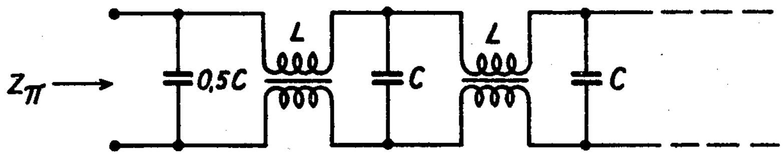
Figure 2:
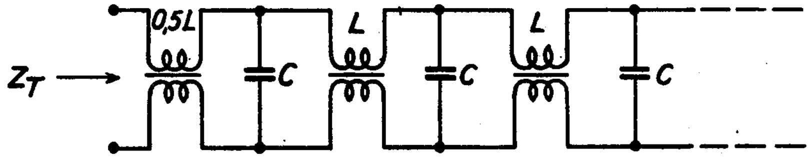
Figure 3:
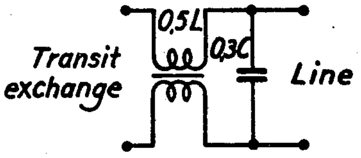
Figure 4:
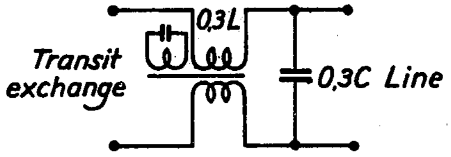
Figure 5:
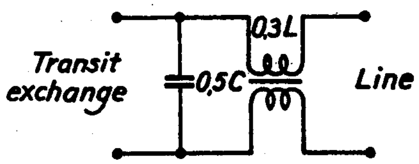
Figure 6:
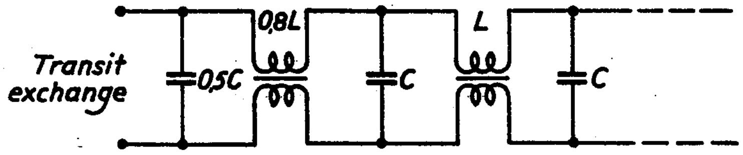
Figure 7:
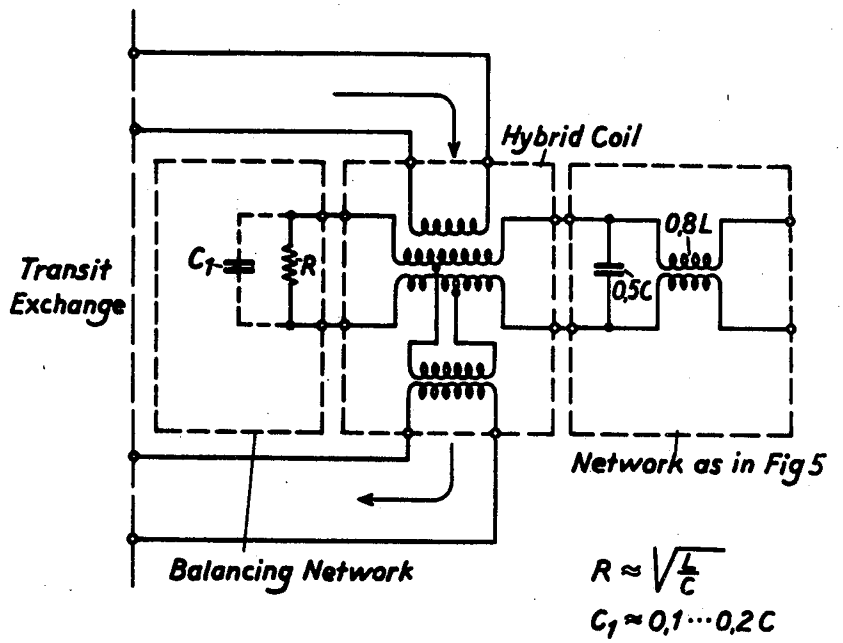

An arrangement and the method according to the invention will now be more fully described with reference to the accompanying drawing, where FIG. 1 shows a coil-loaded circuit starting with a capacitive half-section, FIG. 2 a coil-loaded circuit starting with an inductive half-section, FIGS. 3 and 4 show different impedance correction networks of known types for the circuit according to FIG. 1, FIG. 5 shows an impedance correction network according to the invention for the circuit according to FIG. 2, FIG. 6 shows the uniting of the circuit according to FIG. 2 and the impedance correction network according to FIG. 5, and FIG. 7 shows a hybrid coil with a balancing network according to the invention.

In FIG. 1 a coil-loaded circuit is schematically shown, that is a symmetric circuit in which at regular distances inductance coils are connected. Each of the coils has an inductance of L henrys for decreasing within a limited frequency region, generally comprising the speech frequency region, the attenuation, and the attenuation distortion, which are mainly dependent on the resistance and the capacitance of the line. The shunt capacitance of the circuit is presumed to be C farads per loading-section while its series- and shunt-resistances and the self-inductance for the cases mentioned are neglected, as is the capacitance, leakage and losses of the loading-coils. Under these circumstances the circuit is to be looked upon as a chain of identical low pass filters of the so-called constant-k type. The input admittance, presuming a reflection free termination at the far end, will be $$1/Z=\sqrt{1-(f/f_1)^2}/Z_0$$

where $Z_0=\sqrt{L/C}$ $f$=the frequency in Hz. and $f_1$ the cut-off frequency$=1/\pi\sqrt{LC}$ In the pass band the admittance is real and is reproduced in an admittance-frequency diagram as a quarter ellipse with one half size $1/Z_0$ and the other $f_1$.

If, instead of as in FIG. 1, starting with half a capacitive loading-section, the coil-loaded circuit starts with half a loading-coil followed by a whole loading-section (see FIG. 2) which case is, however, less common, the input impedance $Z_T$ has an elliptic frequency characteristic with the halves of the axes being $Z_0$ and $f_1$.

In practice the impedance characteristics related above are for the major part of the speech frequency region. Only in its lower regions are the characteristics notably modified by the influence of the line resistance. In the following, attention will be drawn to the upper frequency region, in which, according to the above, the impedance varies strongly. For example, the impedance Z according to FIG. 1, is $\sqrt{2}\cdot Z_0$ at the frequency $f_1/\sqrt{2}$ and the impedance $Z_T$ according to FIG. 2 is $Z_0/\sqrt{2}$ at the same frequency. This implies in both cases that the reflection attenuation for a resistance$=Z_0$ is theoretically only about 9 db at this frequency (about 71% of the cut-off frequency).

When amplifying telephone circuits it is important that reflections should not occur which cause disturbing echoes or singing tendencies. These disturbances may of course be avoided by using different circuits for the two speech directions in accordance with the so called four-wire principle. However, this solution is not economically justified for coil-loaded circuits of the lengths that are now common. Where a repeater of the conventional two-wire type is permanently connected to a circuit starting with a capacitive half-section it is possible to arrange individual balancing networks for the coil-loaded circuits, usually so-called Hoyt-balances, and to get thereby a very good freedom from reflections at the near end of the circuits. The case corresponds to providing amplification in telephone exchanges (transit centers) of a four-wire type. In both cases the termination impedance of the coil-loaded circuit for currents coming from the line is mainly real and frequency independent. These currents are thus exposed to reflection, the amplification section having a large attenuation, however, the reflection on the input side of the amplification equipment has relatively little importance.

When conventional repeaters are used in exchanges of the two-wire type, balancing networks of a common type must be used for all kinds of incoming circuits, such as coil-loaded circuits of different kinds, carrier circuits, open wire circuits and unloaded cable circuits. For simplicity's sake the compromise balancing networks used, so-called local balances, are generally constructed so that the impedance is mainly real and frequency independent in the speech frequency region. For those circuits needing amplification the most, that is the coil-loaded circuits, it is thus very desirable that the impedance is given a more constant frequency characteristic than the one previously shown. The size of the impedance at lower frequencies may of course always be brought to a suitable value by means of line transformers.

Recently one has become aware of the importance of providing negative-impedance repeaters with shunt- as well as series-elements and of the connected lines having resistive, frequency independent impedances. For stability reasons the amplification is not brought to very high values to this type of repeater, and so the reflections on the input side of the repeater are relatively more important. A change in the impedance elements of the repeater for matching of the repeater impedance to correspond to the impedance of the circuit, would, however, decrease the possibilities of equilization of the attenuation of the circuit.

Different impedance matching networks have been used for matching the impedance of coil-loaded circuits to exchange impedances, that are mainly real and frequency independent.

Coil-loaded lines starting with a capacitive half-section according to FIG. 1 may thus be connected to the exchange by matching links for example according to FIG. 3 or 4. Stated values of the components are approximate. The link shown in FIG. 4 is, according to Zobel, an $m$-derivated low pass filter section ($m$=0.6) and is as a matter of fact part of the Hoyt balance mentioned before. Of course it is possible to obtain a better match by 3-element-links than by 2-element-links. The coil-loaded circuit of FIG. 1 with the impedance shown in FIG. 4 thus theoretically has a reflection attenuation of at least 34 db to a constant resistance $Z_0$ in the frequency band up to about 85% of the cut-off frequency under the mentioned idealized conditions. The link according to FIG. 3 theoretically has a reflection attenuation of about 23 db. In practice the values naturally get worse because of reflections along the line length and at the far end among other reasons. It is questionable, however, whether the use of complicated networks links in order to obtain a good match is justified in connection with two-wire telephone exchanges since elements which are not to be compensated are brought into the speech paths of such exchanges. Accordingly four-wire switching is generally used in cases where a high degree of amplification is required. For circuits with a relatively small attenuation the reflections at the remote end of the circuit are of importance, so that the profitability of complicated matching measures in the near end is even less for those. Within the Bell System in the USA the simple matching network according to FIG. 3 is thus widely used. This is among other things used for two-wire trunk exchanges, when up to 2 db of the attenuation of the connected coil-loaded circuits are compensated by pad switching the trunk circuits, which are usually of a carrier frequency type.

For the network according to the invention, an impedance inverse to the link in FIG. 3, has the configuration shown in FIG. 5. A coil-loaded circuit, starting with a half coil or an inductive half-section according to FIG. 2 may be considered as an impedance inverse to the link in FIG. 1 and may thus with the network of FIG. 5 be matched to a real, frequency independent exchange impedance. A matching network and a circuit may in this case be put together in a configuration according to FIG. 6. The frequency characteristic of the input impedance will correspond to the one obtained by the Bell-link, FIG. 3, cascade connected with FIG. 1, and the theoretical minimum value of the reflection attenuation will thus be about 23 db. The effect of the network of FIG. 6 may be expressed so that a negative series inductance 0.2L has been inserted at a distance of half a loading-section from the near end of the homogeneous coil-loaded circuit according to FIG. 1. At low frequencies this series inductance has an inconsiderable effect, mainly so that the input impedance gets a small capacitive component (more fully discussed hereinafter). In the higher frequency region we consider for simplicity's sake the frequency $f_1/\sqrt{2}$ (about 71% of the cut-off frequency). At this frequency the phase shift of half the loading-section is $\pi/4$ radians, so that, seen from the near end, the reflection currents caused by the insertion have been exposed to a phase shift of $\pi/2$ radians, that is the negative series resistance at the near end. Thus the impedance increase of a network according to FIG. 1 at higher frequencies in the pass band is compensated for.

The proposed new method for impedance correction apparently fills the same transmission technical demands as the Bell-link. The configuration according to FIG. 6 has certain properties, however, that make it particularly advantageous in practical usage. This is due to the fact that the capacitances in FIG. 6 correspond to the loading-section capacitances that exist in circuits coil-loaded in a conventional way, cf. FIG. 1. The shunt capacitance of the impedance compensator may thus be formed by an end section of the circuit with a length corresponding to half a normal loading-section. This implies that when laying out routes for new cables the loading points may be laid out in the usual way. In the loading point positioned next to the exchange or repeater station a particular value of the coil inductance is chosen, this value being 80% of the inductance of other loading points. Existing cables may be impedance corrected by changing the equipment in the nearest loading point in accordance with the same principle. The disconnected loading coils may be used for new cables. No extra impedance correcting network is required at the exchange. Particularly for phantomized circuits the shunt capacitances of such networks would make a complication with regard to the capacitance balancing required for preventing crosstalk between side and phantom circuits in the same quad.

An impedance corrected circuit according to the invention may in a known way be connected to a hybrid coil or four-wire terminating set for the purpose of inserting amplification in both transmission directions or for making possible the connection to a carrier frequency equipment as shown in FIG. 7. In that case the balancing network belonging to the terminating set should comprise a resistor R. If the circuit is connected to a two-wire telephone exchange the balancing network will have the character of a compromise balance as was mentioned before. It should then preferably comprise also a shunt capacitor C1 for compensating, except for capacitances in the telephone exchange, some part of the circuit capacitances in the non-loaded local exchange networks. In this case the configuration according to FIG. 6 is particularly suitable for the coil-loaded circuits since the input admittance here has a positive imaginary part corresponding to 0.2 C at low frequencies, that is, the capacitance of a fifth of a loading-section, and does not fall to 0.14 C until at about half the cut-off frequency. If the capacitor in the balancing network is from 0.1 to 0.2 times the line capacitance of a whole loading-section together with a possible compensation for exchange capacitance an improvement is obtained for connected coil-loaded circuits as well as for the local exchange circuits. Contrary to this the input impedance of coil-loaded circuits with the known impedance compensator according to FIG. 3, shows an inductive component, that is, it strongly diverges from the impedance of the local exchange circuits, so that the common compromise balance in this case must be dimensioned under more unfavourable circumstances.

I claim:

1. Apparatus for connecting the terminals of a telephone exchange to a line having coil loaded sections terminated by an inductive half section and having an impedance within an operating pass band which is substantially independent of frequency, said apparatus comprising an impedance compensator including a series inductor means having an inductance which is substantially 0.3 times the inductance of a whole loading coil, and a shunt capacitor means having a capacitance which is substantially 0.5 times the capacitance of a whole loading section, said shunt capacitor means being on the exchange side of said compensator and said inductor means connected to said line, a four-wire terminating set means connecting said impedance compensator to said terminals for amplifying signal transmission in two directions, and a balancing network connected to said four-wire terminating set means, said balancing network means comprising a resistor having a resistance in ohms equal to the square root of the ratio between the inductance in henrys of a whole loading coil and the capacitance in farads of a whole loading section.

2. Apparatus according to claim 1, wherein the balancing network further comprises a capacitor shunting said resistor, the capacitance of said capacitor being approximately 0.1 to 0.2 times the capacitance of a whole loading-section.

References Cited

UNITED STATES PATENTS

| | | | |
|---|---|---|---|
| 1,243,066 | 10/1917 | Hoyt | 333—28 |
| 1,475,997 | 12/1923 | Hoyt | 333—28 |
| 1,601,023 | 9/1926 | Hoyt | 333—8 |
| 1,733,127 | 10/1929 | Lewis | 333—33 |
| 1,772,558 | 8/1930 | Shea | 333—28 XR |
| 1,837,327 | 12/1931 | Lewis | 333—8 XR |
| 2,371,252 | 3/1945 | Milnor | 178—45 XR |

HERMAN KARL, SAALBACH, Primary Examiner

SAXFIELD CHATMON, Jr., Assistant Examiner

U.S. Cl. X.R.

179—173; 333—8, 27